(12) United States Patent
Liao et al.

(10) Patent No.: US 12,499,940 B2
(45) Date of Patent: Dec. 16, 2025

(54) CHANGING RESISTANCE OF MODULATION SYSTEM WITH CHANGING RESISTANCE OF MEMRISTOR TO OUTPUT COMPUTATION RESULT

(71) Applicant: Huawei Technologies Co., Ltd., Shenzhen (CN)

(72) Inventors: Jianxing Liao, Shenzhen (CN); Wei Wu, Shenzhen (CN); Leibin Ni, Shenzhen (CN); Kanwen Wang, Shanghai (CN); Rui Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 69 days.

(21) Appl. No.: 17/733,233

(22) Filed: Apr. 29, 2022

(65) Prior Publication Data

US 2022/0262435 A1 Aug. 18, 2022

Related U.S. Application Data

(63) Continuation of application No. PCT/CN2020/125430, filed on Oct. 30, 2020.

(30) Foreign Application Priority Data

Nov. 1, 2019 (CN) .......................... 201911061782.9
Nov. 18, 2019 (CN) .......................... 201911127874.2

(51) Int. Cl.
*G11C 13/00* (2006.01)

(52) U.S. Cl.
CPC ........ *G11C 13/0038* (2013.01); *G11C 13/003* (2013.01)

(58) Field of Classification Search
CPC ............ G11C 2213/72; G11C 2213/73; G11C 2213/74; G11C 2213/79
See application file for complete search history.

(56) References Cited

U.S. PATENT DOCUMENTS 8,531,866 B2 9/2013 Ikegami et al.
9,502,114 B1 11/2016 Lin et al.
(Continued)

FOREIGN PATENT DOCUMENTS

CN 101246740 A 8/2008
CN 103828238 A 5/2014
(Continued)

OTHER PUBLICATIONS

Moon, K., et al., "Improved Conductance Linearity and Conductance Ratio of 1T2R Synapse Device for Neuromorphic Systems," IEEE Electron Device Letters, vol. 38, No. 8, Aug. 2017, 4 pages.
(Continued)

*Primary Examiner* — Alfredo Bermudez Lozada
(74) *Attorney, Agent, or Firm* — Conley Rose, P.C.

(57) ABSTRACT

A unit includes a first transistor, a memristor, and a resistance modulation unit, where a first port of the resistance modulation unit and a first port of the memristor are coupled to a first electrode of the first transistor, and the first electrode of the first transistor is configured to control the first transistor to be coupled and decoupled. The resistance modulation unit is configured to adjust, based on a resistance of the memristor, a voltage applied to the first electrode of the first transistor. The resistance of the memristor indicates the first data stored by the memristor, and when a voltage indicating second data is input to a second electrode of the first transistor which is configured to output a computation result of the first data and the second data from a third electrode of the first transistor.

20 Claims, 7 Drawing Sheets

(56) References Cited

U.S. PATENT DOCUMENTS

| | | | |
|---|---|---|---|
| 9,721,661 | B1 | 8/2017 | Buchanan et al. |
| 9,928,909 | B1* | 3/2018 | Loibl |
| 10,573,375 | B1* | 2/2020 | He .................. G11C 11/413 |
| 2012/0087172 | A1 | 4/2012 | Aoki |
| 2013/0027079 | A1 | 1/2013 | Nazarian et al. |
| 2014/0177318 | A1* | 6/2014 | Ting .................. G11C 13/0007 |
| | | | 365/148 |
| 2015/0255509 | A1 | 9/2015 | Strenz et al. |
| 2017/0301730 | A1 | 10/2017 | Cao et al. |
| 2020/0258587 | A1* | 8/2020 | Li .................. G11C 15/046 |

FOREIGN PATENT DOCUMENTS

| | | |
|---|---|---|
| CN | 106158000 A | 11/2016 |
| CN | 107301875 A | 10/2017 |
| CN | 209231927 F | 8/2019 |
| CN | 110956993 A | 4/2020 |
| CN | 111462798 A | 7/2020 |
| KR | 20180011016 A | 1/2018 |
| WO | 2013019678 A2 | 2/2013 |

OTHER PUBLICATIONS

Zhu, Z., et al., "A Configurable Multi-Precision CNN Computing Framework Based on Single Bit RRAM," DAC '19, Jun. 2-6, 2019, Las Vegas, NV, USA, 6 pages.

* cited by examiner

CHANGING RESISTANCE OF MODULATION SYSTEM WITH CHANGING RESISTANCE OF MEMRISTOR TO OUTPUT COMPUTATION RESULT

CROSS-REFERENCE TO RELATED APPLICATIONS

This is a continuation of International Patent Application No. PCT/CN2020/125430 filed on Oct. 30, 2020, which claims priority to Chinese Patent Application No. 201911127874.2 filed on Nov. 18, 2019 and Chinese Patent Application No. 201911061782.9 filed on Nov. 1, 2019. All of the aforementioned patent applications are hereby incorporated by reference in their entireties.

TECHNICAL FIELD

This disclosure relates to the storage field, and in particular, to a storage and computing unit and a chip.

BACKGROUND

With development of new technologies such as big data, artificial intelligence, and neural networks, massive data needs to be stored and computed on a large scale. In some conventional computer structures, a memory is connected to a processor through a data bus. During computation, the memory needs to transmit data to the processor through the data bus. The processor performs computation processing on the received data, and a computation speed is limited by a speed at which the memory transmits the data through the data bus. To improve a data processing speed, a chip integrating a processor and a memory is proposed. The chip includes a storage and computing array. The storage and computing array includes a large quantity of identical storage and computing units.

In some storage and computing units, an on-off ratio of an output current is relatively small, that is, a computing capability is limited by a ratio of a high resistance to a low resistance of a memristor in the storage and computing unit. Therefore, a storage and computing array including some storage and computing units cannot perform large-scale computation. In addition, resistance fluctuation of the memristor may cause an error in a computation result of the storage and computing unit.

SUMMARY

This disclosure provides a storage and computing unit and a chip, to improve an on-off ratio of an output current of the storage and computing unit, reduce an error in a computation result caused by resistance fluctuation of a memristor, significantly improve a data computation throughput, and reduce energy consumption of a computing system.

A first aspect provides a storage and computing unit, including a first transistor, a memristor, and a resistance modulation unit, where a first port of the resistance modulation unit and a first port of the memristor are connected to a first electrode of the first transistor, and the first electrode of the first transistor is configured to control the first transistor to be connected and disconnected, the resistance modulation unit is configured to adjust, based on a resistance of the memristor, a voltage applied to the first electrode of the first transistor, the memristor is configured to store first data, where the resistance of the memristor is used to indicate the first data, and when a voltage used to indicate second data is input to a second electrode of the first transistor, the first transistor is configured to output a computation result of the first data and the second data from a third electrode of the first transistor.

A resistance of the resistance modulation unit changes as the resistance of the memristor changes.

Further, in this disclosure, the resistance of the resistance modulation unit may change as a voltage applied to two ends of the resistance modulation unit changes.

Moreover, the memristor is a component whose resistance changes as a voltage applied to the component changes.

In this disclosure, the resistance modulation unit and the memristor may be connected in series, and a voltage applied to two ends of a series circuit including the resistance modulation unit and the memristor remains unchanged. Therefore, the resistance modulation unit and the memristor can form a voltage division structure.

Therefore, the resistance of the resistance modulation unit can change as the resistance of the memristor changes.

According to the foregoing structure, if the resistance of the memristor increases, the resistance of the resistance modulation unit decreases, or if the resistance of the memristor decreases, the resistance of the resistance modulation unit increases.

Moreover, ports (that is, the first ports) through which the resistance modulation unit is connected to the memristor are connected to the first electrode of the first transistor (that is, an electrode for controlling the first transistor to be connected and disconnected), so that the voltage of the first electrode of the first transistor can change as the division voltage of the memristor changes. To be specific, a change range of the first electrode of the first transistor may be the same as a voltage division range of the memristor, that is, an on-off ratio of an output current of the storage and computing unit may be far greater than a resistance change range of the memristor. Therefore, the on-off ratio of the output current of the storage and computing unit is improved.

In addition, because the voltage of the first electrode of the first transistor can be changed as the division voltage of the memristor changes, impact of resistance fluctuation of the memristor in a range on the voltage of the first electrode can be reduced, that is, there is little impact on the output current. Therefore, the storage and computing unit further has a feature of low fluctuation, and accuracy of the output current is improved, that is, an error in a computation of the storage and computing unit can be reduced.

Optionally, the first transistor includes a bipolar transistor. In this case, the first electrode includes a base electrode of the bipolar transistor.

Optionally, the first transistor includes a field-effect transistor. In this case, the first electrode includes a gate electrode.

With reference to the first aspect, in some implementations of the first aspect, the resistance modulation unit includes a second transistor, and the first port of the resistance modulation unit includes any electrode except a first electrode of the second transistor, and the first electrode of the second transistor is configured to control the second transistor to be connected and disconnected.

Optionally, the second transistor includes a bipolar transistor. In this case, the first electrode includes a base electrode of the bipolar transistor.

Optionally, the second transistor includes a field-effect transistor. In this case, the first electrode includes a gate electrode.

If the resistance of the memristor is in a high-resistance state, the second transistor works in a linear region. In this case, a resistance of the second transistor is lowest, the voltage on the gate electrode of the first transistor reaches a largest value, and the output current of the first transistor is highest. When the resistance of the memristor is in a low-resistance state, the second transistor works in a saturation region, a resistance of the second transistor is highest, the voltage on the gate electrode of the first transistor reaches a smallest value, and the output current of the first transistor is lowest.

In this method, a resistance modulation function may be implemented based on a change of the resistance of the second transistor in the linear region and in the saturation region. Therefore, an on-off ratio of an output current of the first transistor is not limited to the resistance change range of the memristor, and the on-off ratio of the output current is larger.

With reference to the first aspect, in some implementations of the first aspect, the resistance modulation unit includes a selector or a varistor.

With reference to the first aspect, in some implementations of the first aspect, the memristor includes any one of the following components: a phase change memory, a ferroelectric memory, a magnetoresistive random-access memory (RAM), or a resistive RAM.

A second aspect provides a chip, including a storage and computing array, where the storage array includes a plurality of storage and computing units, and a first storage and computing unit in the plurality of storage and computing units includes a first transistor, a memristor, and a resistance modulation unit, where a first port of the resistance modulation unit and a first port of the memristor are connected to a first electrode of the first transistor, and the first electrode of the first transistor is configured to control the first transistor to be connected and disconnected, the resistance modulation unit is configured to adjust, based on a resistance of the memristor, a voltage applied to the first electrode of the first transistor, the memristor is configured to store first data, where the resistance of the memristor is used to indicate the first data, and when a voltage used to indicate second data is input to a second electrode of the first transistor, the first transistor is configured to output a computation result of the first data and the second data from a third electrode of the first transistor.

As described above, because an on-off ratio of an output current of the storage and computing unit provided in this disclosure is far greater than a resistance change range of the memristor, the on-off ratio of the output current of the storage and computing unit is improved. Further, an on-off ratio of an output current of the chip provided in this disclosure and having the storage and computing array including the plurality of storage and computing units can be relatively large, that is, a computing capability is not limited by a ratio of a high resistance to a low resistance of the memristor in the storage and computing unit. Therefore, large-scale computation can be performed. In addition, an error in the computation result of the chip caused by resistance fluctuation of the memristor can be reduced.

Optionally, a resistance of the resistance modulation unit changes as the resistance of the memristor changes.

For example, if the resistance of the memristor increases, the resistance of the resistance modulation unit decreases, or for another example, if the resistance of the memristor decreases, the resistance of the resistance modulation unit increases.

Optionally, the resistance modulation unit includes a selector or a varistor.

In this case, the storage and computing array includes storage and computing units in M rows×N columns, M and N being integers greater than 1, where second ports of resistance modulation units in a plurality of storage and computing units located in a same row are connected to a same bit line (BL), second electrodes of first transistors in a plurality of storage and computing units located in a same row are connected to a same input data line (or read line (RL)), where the input data line is configured to input to-be-computed data, third electrodes of first transistors in a plurality of storage and computing units located in a same column are connected to a same output data line (or computing line (CL)), where the output data line is configured to output a computation result, second ports of memristors in a plurality of storage and computing units located in a same column are connected to a same selection line (or source line (SL)), and the BL and the SL are configured to select storage and computing units that are to perform computation.

Optionally, the resistance modulation unit includes a second transistor, and the first port of the resistance modulation unit includes any electrode except a first electrode of the second transistor, and the first electrode of the second transistor is configured to control the second transistor to be connected and disconnected.

In this case, the storage and computing array includes storage and computing units in M rows×N columns, M and N being integers greater than 1, where second ports of resistance modulation units in a plurality of storage and computing units located in a same column are connected to a same bit line, where the second port of the resistance modulation unit includes a third electrode of the second transistor, second electrodes of first transistors in a plurality of storage and computing units located in a same row are connected to a same input data line, where the input data line is configured to input to-be-computed data, third electrodes of first transistors in a plurality of storage and computing units located in a same column are connected to a same output data line, where the output data line is configured to output a computation result, second ports of memristors in a plurality of storage and computing units located in a same column are connected to a same selection line, first electrodes of the second transistors in a plurality of storage and computing units located in a same row are connected to a same word line, where the word line is configured to control the second transistors to be connected and disconnected, and the bit line and the selection line are configured to select storage and computing units that are to perform computation.

Optionally, when the storage and computing array includes storage and computing units in M rows×N columns, second ports of resistance modulation units in a plurality of storage and computing units located in a same column are connected to a same bit line, where the second port of the resistance modulation unit includes a third electrode of the second transistor, second electrodes of first transistors in a plurality of storage and computing units located in a same row are connected to a same input data line, where the input data line is configured to input to-be-computed data, third electrodes of first transistors in a plurality of storage and computing units located in a same column are connected to a same output data line, where the output data line is configured to output a computation result, second ports of memristors in a plurality of storage and computing units located in a same row are connected to a same selection line, first electrodes of the second transistors in a plurality of storage and computing units located in a same row are connected to a same word line, where the word line is configured to control the second transistors to be connected and disconnected, and the bit line and the selection line are configured to select storage and computing units that are to perform computation.

Optionally, the memristor includes any one of the following components: a phase change memory, a ferroelectric memory, a magnetoresistive RAM, or a resistive RAM.

A third aspect provides a neural network device, including at least one chip according to any one of the second aspect and the possible implementations of the second aspect.

DESCRIPTION OF EMBODIMENTS

The following describes technical solutions of this disclosure with reference to accompanying drawings.

A storage and computing unit and a chip provided in this disclosure may be effectively applied to a computing device that needs to perform large-scale computation, such as a neural network device.

Figure 1:
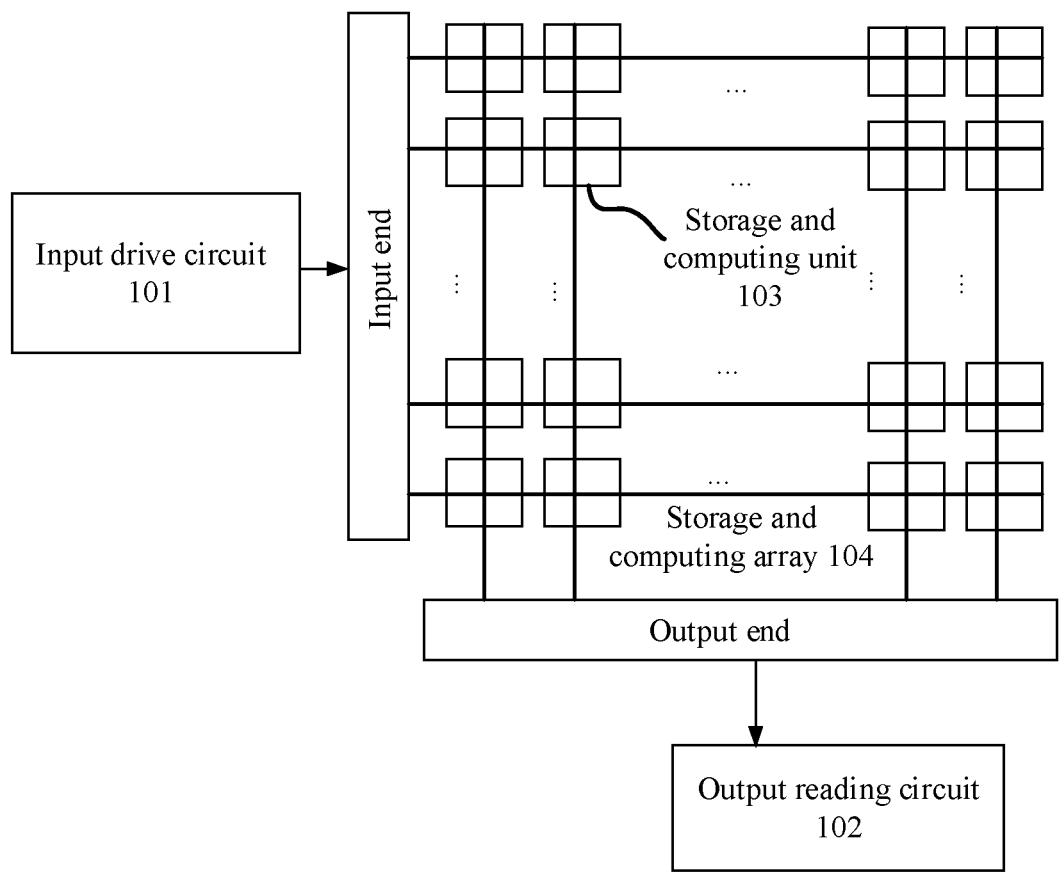
FIG. 1 is a schematic architectural diagram of a computing device to which a storage and computing unit and a chip according to this disclosure are applicable.

As shown in FIG. 1, the computing device (or an integrated storage and computing device) includes a storage and computing array 104, an input drive circuit 101, and an output reading circuit 102. The input drive circuit 101 is connected to an input end of the storage and computing array provided in this disclosure, provides an input voltage for the storage and computing array, and starts a storage and computing unit 103 in the array. The output reading circuit is connected to an output end of the storage and computing array 104 provided in this disclosure, and outputs a computation result of the storage and computing unit in the storage and computing array. The storage and computing array 104 includes storage and computing units 103, that is, several storage and computing units are connected to form a regular storage and computing array. A connection mode of the storage and computing array is described in detail later.

Figure 2A:
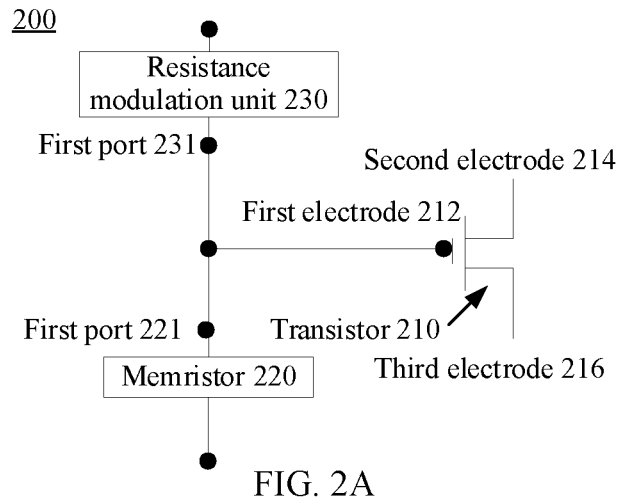
FIG. 2A, FIG. 2B, and FIG. 2C are structural diagrams of a storage and computing unit according to this disclosure.
Figure 2B:
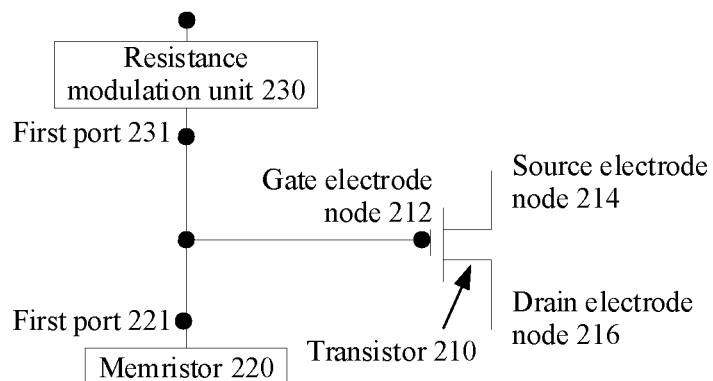
Figure 2C:
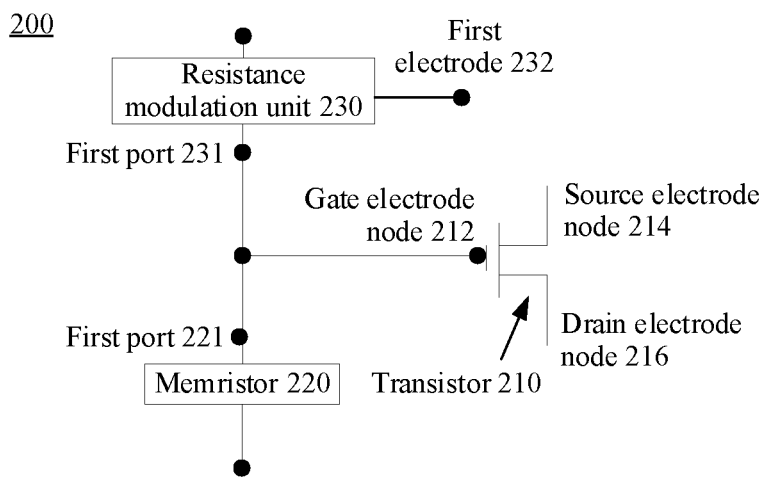

FIG. 2A to FIG. 2C are a structural diagram of a storage and computing unit 200 according to this disclosure. As shown in FIG. 2A, the storage and computing unit 200 includes a transistor 210 (that is, an example of a first transistor), a memristor 220, and a resistance modulation unit 230. The following describes functions and structures of the foregoing components separately in detail.

A. Transistor 210:

A transistor is often used as a variable current switch capable of controlling an output current based on an input voltage. The transistor uses a voltage signal to control the transistor to be turned on or off, and a switching speed is very high.

Generally, the transistor includes three terminals, which are also referred to as three electrodes. One electrode, for example, a gate electrode of a field-effect transistor, may be configured to control the transistor to be connected or disconnected.

Based on a relationship between an output current and an input voltage, the transistor may be approximately divided into three regions: a cut-off region, a linear region, and a saturation region. The cut-off region is a state in which the transistor is not turned on when the input voltage is lower than a threshold voltage. In this case, the output current of the transistor is zero. The linear region means that the output current of the transistor changes linearly with the input voltage in a voltage range. The saturation region means that when the input voltage is higher than a saturation voltage, the output current of the transistor remains constant and does not change as the input voltage changes.

In this disclosure, for example, the transistor may include a field-effect transistor, for example, a hole-type (P-type) metal-oxide-semiconductor (PMOS) field-effect transistor, or an electronic-type (N-type) metal-oxide-semiconductor (NMOS) field-effect transistor. The field-effect transistor includes three electrodes: a source electrode, a gate electrode, and a drain electrode.

For another example, the transistor may further include a bipolar transistor, where the bipolar transistor includes three electrodes: an emitter electrode, a base electrode, and a collector electrode.

It should be understood that the transistors illustrated above are merely examples for description, and this disclosure is not limited thereto. For example, a junctionless transistor, a thin film transistor, a two-dimensional material transistor, a nanowire transistor, a fin field-effect transistor, a gate-all-around field-effect transistor, or the like may be further illustrated.

For ease of understanding and description, the following uses an example in which a field-effect transistor is used as the transistor for detailed description.

To be specific, as shown in FIG. 2B, in this embodiment of this disclosure, the transistor 210 includes a gate electrode node 212 (that is, an example of a first electrode), a source electrode node 214 (that is, an example of a second electrode), and a drain electrode node 216 (that is, an example of a third electrode).

B. Memristor 220:

A memristor is a non-volatile memory based on reversible switching between a high-resistance state and a low-resistance state of a non-conductive material under action of an applied electric field. A process of switching a resistive RAM from a low-resistance state to a high-resistance state is referred to as a reset operation, and a process of switching the resistive RAM from the high-resistance state to the low-resistance state is referred to as a set operation. Generally, the two operations on the resistive RAM are collectively referred to as programming operations.

The memristor generally uses a metal-dielectric-metal structure. The two metal layers are two electrodes, and each electrode corresponds to one port of the resistive component. To be specific, as shown in FIG. 2B, the memristor 220 includes a first port 221.

For example, the memristor may be illustrated as a phase change memory (PCM), a ferroelectric memory, a magnetoresistive RAM (MRAM), or a resistive RAM (RRAM).

C. Resistance Modulation Unit 230:

A resistance modulation unit is a component whose resistance can change as an input voltage applied to the component changes, for example, a metal oxide semiconductor field-effect transistor mentioned above, or another resistance-adjustable component made of a semiconductor and a metal material, for example, a selector. The component can quickly switch between a high-resistance state and a low-resistance state depending on the voltage at both ends.

The resistance modulation unit 230 may be implemented by using a two-port component (that is, an implementation 1), or may be implemented by using a three-port component (that is, an implementation 2). This is not limited in this disclosure. The following describes the two implementations in detail with reference to accompanying drawings.

Implementation 1:

As shown in FIG. 2B, the two-port resistance modulation unit 230 includes a first port 231. In this case, a specific circuit connection structure of the storage and computing unit provided in this embodiment of this disclosure is as follows.

The first port 231 of the resistance modulation unit 230 and the first port 221 of the memristor 220 are connected to the gate electrode node 212 of the transistor 210.

Implementation 2:

As shown in FIG. 2C, the three-port resistance modulation unit 230 includes a first port 231 and a first electrode 232. In this case, a specific circuit connection structure of the storage and computing unit provided in this embodiment of this disclosure is as follows.

The first port of the resistance modulation unit 230 and the first port of the memristor 220 are connected to the gate electrode node 212 of the transistor 210.

The foregoing describes a circuit connection mode of the storage and computing unit 200. The following describes a resistance change process of the resistance modulation unit 230 of the storage and computing unit in this embodiment of this disclosure.

The resistance of the resistance modulation unit 230 may be adjusted based on a voltage applied to the unit. When the resistive RAM 220 is in the high-resistance state, because the resistive RAM 220 and the resistance modulation unit 230 form a voltage division structure, the resistive RAM 220 changes the voltage at two ends of the resistance modulation unit 230, so that the resistance modulation unit 230 matches the low-resistance state in which the voltage of the gate electrode node 212 is highest. When the resistive RAM 220 is in the low-resistance state, because the resistive RAM 220 and the resistance modulation unit 230 form a voltage division structure, the resistive RAM 220 changes the voltage at two ends of the resistance modulation unit 230, so that the resistance modulation unit 230 matches the high-resistance state in which the voltage of the gate electrode node 212 is lowest.

To be specific, according to the solution provided in this embodiment of this disclosure, because the output current (drain current) of the transistor 210 is in direct proportion to the voltage of the gate electrode of the transistor 210, an on-off ratio of the output current of the transistor 210 is not limited to a resistance change range of the resistive RAM, that is, an on-off ratio of the output current of the storage and computing unit is far greater than a ratio of a high resistance to a low resistance of the resistive RAM in the unit.

Therefore, the structure of the storage and computing unit provided in this disclosure significantly improves the on-off ratio of the output current. In addition, because the output current suppresses voltage fluctuation of the gate electrode of the transistor 210, the storage and computing unit further has a feature of low fluctuation, and accuracy of the output current is improved.

Figure 3:
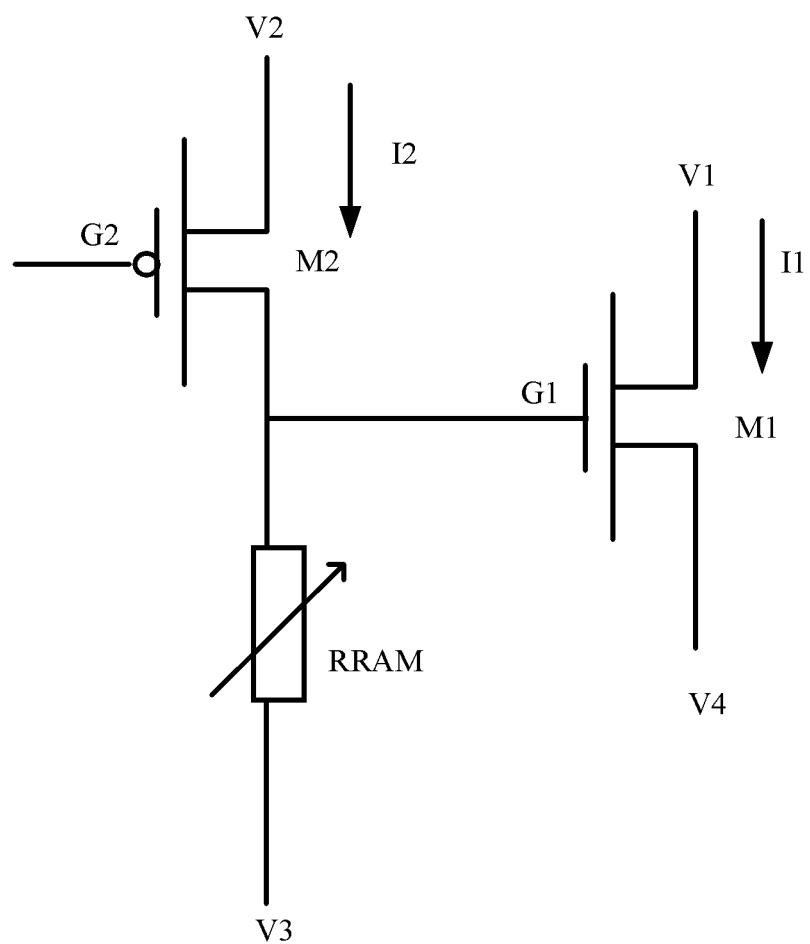
FIG. 3 is a schematic diagram of an example of a storage and computing unit according to an embodiment of this disclosure.

The foregoing describes the storage and computing unit provided in this disclosure. The following uses an example in which the resistance modulation unit is a transistor, and the resistive RAM is an RRAM to describe in detail an operating principle of the storage and computing unit provided in this disclosure. As shown in FIG. 3, for example, the transistor 210 in this embodiment is an NMOS (M1), and the resistance automatic modulation unit 230 is a PMOS (M2).

An output-end drain electrode of the M2 and an input end of the RRAM are connected in series to form series nodes, and the series nodes are connected to a gate electrode (G1) of the M1. In addition, an input-end source electrode of the M2 provides a first input voltage (V2) for the storage and computing unit in this embodiment, an output end of the RRAM provides a first ground voltage (V3) for the storage and computing unit in this embodiment, a drain electrode of the M1 provides a second input voltage (V1) for the storage and computing unit in this embodiment, a source electrode of the M1 provides a second ground voltage (V4) for the storage and computing unit in this embodiment, and an output of the storage and computing unit is a drain current (I1) of the M1.

This embodiment of this disclosure provides a storage and computing unit that has read and storage functions. The storage function is a function of storing data after a data write operation, and the read function is a function of reading and computing stored data. Therefore, during use, operations may be classified into a data read operation and a data write operation.

When the data read operation is performed, a voltage provided by an external circuit (not shown) is a read voltage (that is, V2) of the storage and computing unit, for example, a 0.5 volts (V) voltage, and V3 is a ground voltage. In this process, it needs to be ensured that V2 and V3 do not change a resistance of the RRAM. In addition, V1 is a high voltage, for example, a 0.5 V voltage, and V4 is a ground voltage, so that the M1 is connected.

If the RRAM is in a highest-resistance state, the M2 is configured in a lowest-resistance state by a voltage input from a gate electrode (G2) of the M2. In this case, a voltage of the G1 is a highest electrical level, and I1 is highest drain current.

Conversely, if the RRAM is in the lowest-resistance state, the G2 of the M2 is configured in the highest-resistance state. In this case, the G1 is a lowest electrical level, and I1 is lowest.

For example, in a specific implementation process, an NMOS whose channel width/length (W/L) ratio is 28 nanometers (nm)/100 nm may be selected for the M1, and a PMOS whose channel width/length (W/L) ratio is 300 nm/100 nm may be selected for the M2. The RRAM has a low resistance of 30 kiloohms (kΩ) and a high resistance of 300 kΩ. V2 is a 0.5 V voltage, and V1 is a 0.5 V voltage. V3 and V4 are ground voltages. A pulse with a high electrical level of 0.5 V and a low electrical level of 0 V is input to the G2.

When the RRAM has a low resistance of 30 kΩ, the voltage of the G1 is 0.17 V, and I1 is 550 picoamperes (pA). In this case, because the M2 works in the saturation region, the resistance of the M2 is about 58 kΩ. When the RRAM has a high resistance of 300 kΩ, the voltage at the G1 point is 0.47 V, and I1 is 1.49 microamperes (μA). In this case, the M2 works in the linear region, and the resistance of the M2 is about 19 kΩ. Therefore, the on-off ratio of the output current (that is, a ratio of a highest current to a lowest current) in an ON state and an OFF state in this embodiment of this disclosure may be more than 2000, far greater than a ratio of a highest resistance to a lowest resistance of the RRAM, that is, 10.

Therefore, in the storage and computing unit provided in this embodiment of this disclosure, a voltage change range of the gate electrode of the M1 can be extended, so that a change range of the output current of the storage and computing unit is not limited to a change range of the high resistance and low resistance of the RRAM, thereby improving a current on-off ratio of the M1.

In addition, during the data write operation, that is, during RRAM programming, a voltage of the G2 of the M2 is a high voltage, the M2 is in the low-resistance state, and V2 and V3 are write voltages. Because the resistance of the RRAM changes as the voltage applied to two ends of the RRAM changes, the resistance of the RRAM changes as voltage values of V2 and V3 change, so that RRAM programming is achieved.

Therefore, the storage and computing unit provided in this embodiment of this disclosure can implement two functions: reading data and writing data. Further, the on-off ratio of the output current of the storage and computing unit is improved, and a computation speed and a computation amount are significantly improved.

Figure 4A:
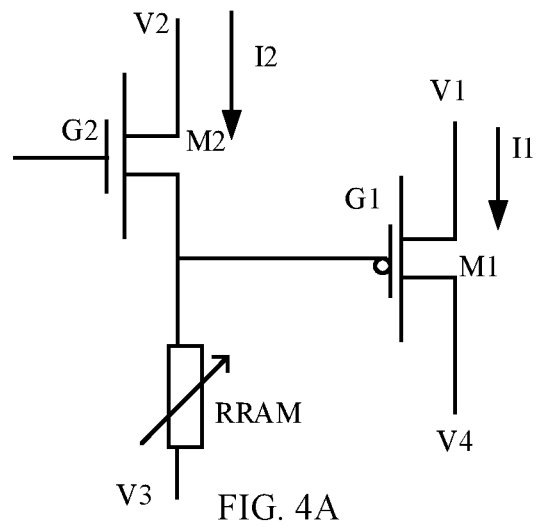
FIG. 4A, FIG. 4B, and FIG. 4C are schematic diagrams of another example of a storage and computing unit according to an embodiment of this disclosure.
Figure 4B:
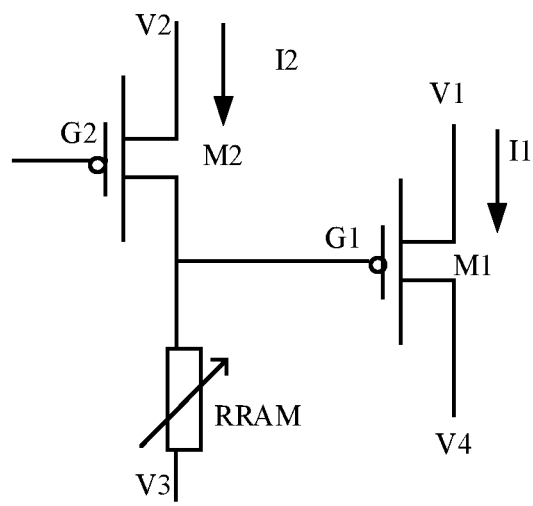
Figure 4C:
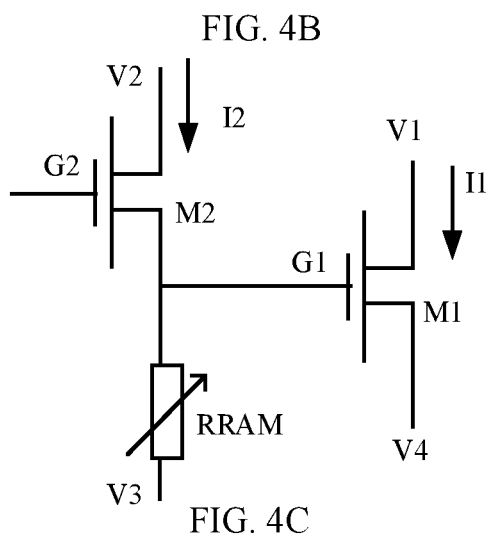

It should be understood that the structure of the storage and computing unit in FIG. 3 is merely an example, and this disclosure is not particularly limited thereto. For example, in the structure of the storage and computing unit, the M2 may alternatively be an NMOS, and the M1 is a PMOS, as shown in FIG. 4A, or the M2 may alternatively be a PMOS, and the M1 is a PMOS, as shown in FIG. 4B, or the M2 may be an NMOS, and the M1 is an NMOS, as shown in FIG. 4C.

The storage and computing unit provided in this disclosure is described above. In actual use, storage and computing units may be connected to form a large-scale storage and computing array according to a specific arrangement rule, to implement large-scale storage and computing functions.

This disclosure provides a chip. The chip includes a storage and computing array. The storage and computing array includes any one of the foregoing storage and computing units, and includes at least a bit line (BL), a source electrode line (SL), an input data line, which may also be referred to as a read line (RL), and an output data line, which may also be referred to as a computing line (CL). A connection mode of the storage and computing array is described in detail later with reference to FIG. 5 and FIG. 7. Details are not described herein.

The storage and computing array may be divided into a programming network and a computing network. The programming network includes a resistance modulation unit and a resistive RAM in a storage and computing unit. The computing network includes a resistive RAM and a transistor 210. During programming, a resistive RAM that needs to be programmed in the programming network of the storage and computing array is selected by applying voltages to the BL and SL, and a resistance of the resistive RAM is programmed by changing voltage values applied to the BL and SL. During computation, the transistor 210 in the computing network of the storage and computing array is turned on by applying a voltage to the RL, and an output current in the computing network is output from the CL and accumulated.

The storage and computing array can simultaneously implement the data storage and computing functions, avoid a process of transmitting data in a memory unit to a computing unit through a data bus during computation, and effectively resolve a problem of a "memory wall" during computation of a computer.

Further, the programming network and the computing network are separated as independent networks. When the storage and computing array performs computation, because an output current of a storage and computing unit included in the storage and computing array has a relatively high on-off ratio, more transistors 210 in the storage and computing array can be turned on simultaneously during computation to improve a computing capability of the storage and computing array.

The following uses an example in which a transistor 210 (an 1) of a storage and computing unit in a storage and computing array is an NMOS, a resistance modulation unit 230 is a transistor (M2), the M2 is a PMOS, and a resistive RAM 220 is an RRAM to describe in detail an operating principle of the storage and computing array provided in this disclosure.

Figure 5:
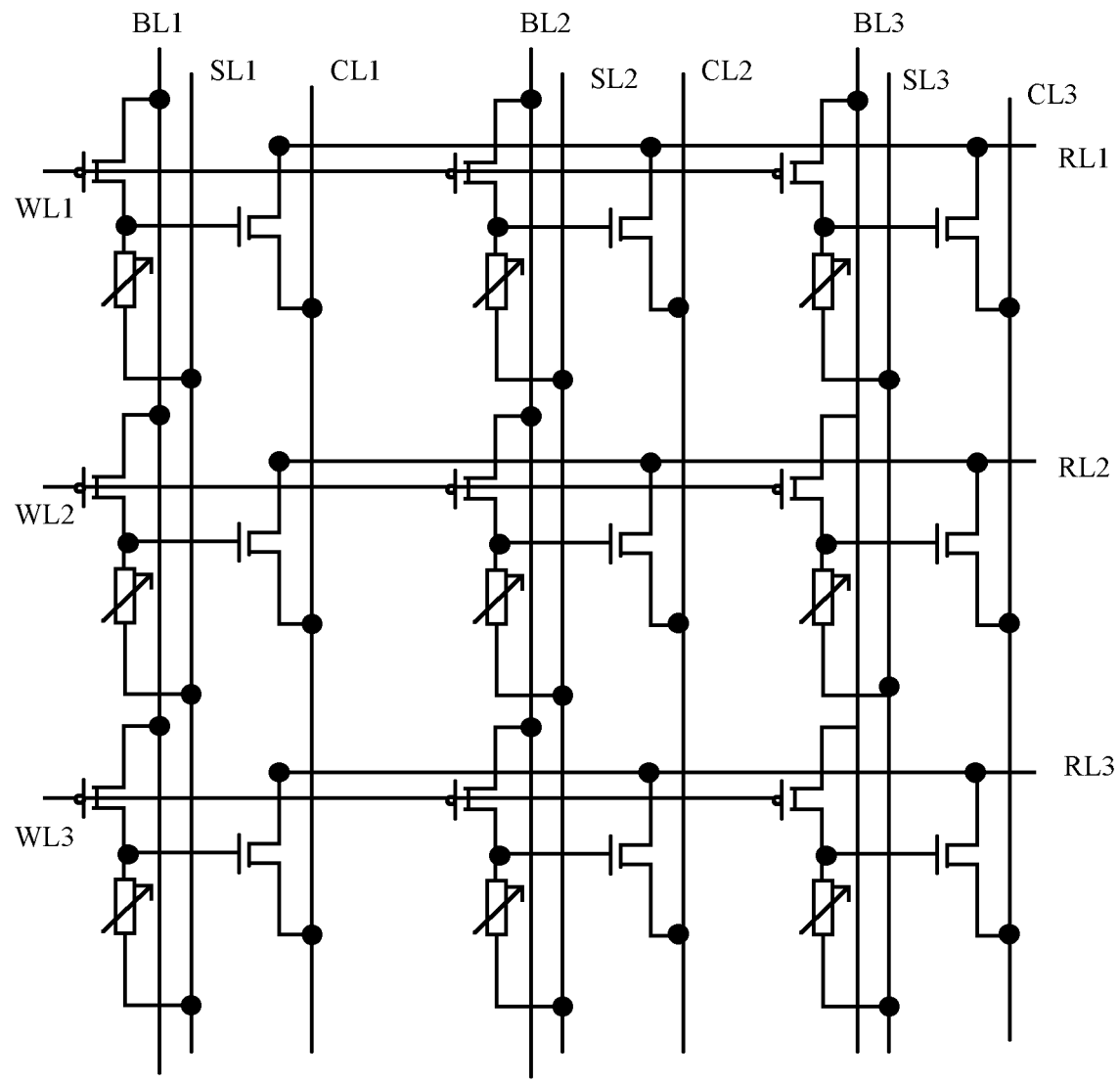
FIG. 5 is a schematic diagram of a storage and computing array according to an embodiment of this disclosure.

FIG. 5 shows a 3×3 storage and computing array in which three storage and computing units in each of horizontal and vertical directions are connected. The storage and computing array includes three storage and computing unit rows and three storage and computing unit columns. Each storage and computing unit row includes one RL and one word line (WL). Each storage and computing unit column includes one SL, one CL, and one BL. Each row includes three storage and computing units shown in FIG. 3. Each column includes three storage and computing units shown in FIG. 3. A gate electrode node of an M2 in each row is electrically connected to the WL in the row. A source electrode node of an M1 in each row is electrically connected to the RL in the row. One end of an RRAM in each column is electrically connected to the SL in the column. A drain electrode node of an M1 in each column is electrically connected to the CL in the column. A drain electrode node of an M2 in each column is electrically connected to the BL in the column.

In other words, a drain electrode of each M2 in a same column is connected to form a BL of the storage and computing array, one end of each RRAM in a same column is connected to form an SL of the storage and computing array, a source electrode of each M1 in the same column is connected to form a CL of the storage and computing array, a gate electrode of each M2 in a same row is connected to form a WL of the storage and computing array, and a drain electrode of each M1 in a same row is connected to form an RL of the storage and computing array. The storage and computing array is divided into two independent networks: a programming network and a computing network. The RRAM and the M2 form the programming network. The RRAM and the M1 form the computing network.

During programming, voltages are applied to the WL, the BL, and the SL to select RRAMs for programming, so that resistances of other components are not affected during programming. When a computation read operation is performed, voltages are applied to the WL, the BL, and the SL, the M1 in the corresponding computing network is turned on, and a computation result is output to the CL by applying a read voltage to the RL, thereby implementing the computation read operation.

For example, when programming is performed by using the storage and computing array, for example, when a programming operation is performed on an RRAM in the first row and the first column in FIG. 5, optionally, an input voltage is applied to a WL1 in the array, so that an M2 in a storage and computing unit in the first row and the first column is turned on. When the programming operation is a set operation (that is, SET), an input voltage may be applied to a BL1, and a ground voltage is applied to an SL1. When the programming operation is a reset operation (that is, RESET), an input voltage may be applied to the SL1, and a ground voltage is applied to the BL1. A resistance of the RRAM in the unit is changed by the voltage on two ends of the RRAM. In this way, the RRAM programming process is completed.

It can be learned that during programming of the RRAM in the storage and computing array, voltages need to be applied to the WL, the BL, and the SL at the same time. Therefore, during programming of an RRAM, resistances of other components are not affected.

For example, when the storage and computing array is used to perform computation reading, for example, when a computation read operation is performed on data stored in all RRAMs in the storage and computing array in FIG. 5, control voltages (low voltages) are applied to the WL1, a WL2, and a WL3, so that each M2 is in a semi-ON state. Read voltages are applied to the BL1, a BL2, and a BL3, and ground voltages are applied to the SL1, an SL2, and an SL3, to ensure that voltages at two ends of the BL1, the BL2, the BL3, the SL1, the SL2, and the SL3 do not change resistances of the RRAMs. Input voltages (that is, voltages of input data) are applied to the RL1, an RL2, and an RL3. In this case, an output current of each M1 in the storage and computing array is accumulated and output on the CL1, the CL2, and the CL3 separately, and the computation read operation of the array is completed.

Input voltages are applied to the RL1, the RL2, and the RL3 in the storage and computing array, and the M1s in the storage and computing array are controlled to perform computation. When the input voltages change, output currents also change linearly. To be specific, when an input voltage has a plurality of bit states, an output current also has a corresponding plurality of bit states.

The structure provided in this disclosure can simultaneously implement data storage and data computing functions, avoid a process of transmitting data in a memory unit to a computing unit through a data bus during computation, and effectively improve a computation processing speed. In addition, because an output current of a storage and computing unit provided in this disclosure has a feature of a very high on-off ratio, when the storage and computing array formed by storage and computing units is used for computation, transistors in more columns of the array may be turned on at the same time, thereby significantly improving a computing capability. In other words, when completing large-scale computation, the storage and computing array provided in this disclosure reduces a quantity of operations, thereby effectively reducing energy consumption of a computing system.

It should be understood that the M1, the M2, and the RRAM are all implementations in this embodiment of this disclosure. In this disclosure, the resistance modulation unit may alternatively be a component whose resistance automatically changes with a division voltage, for example, a selector or a varistor. The resistive component may alternatively be a non-volatile memory with a variable resistance, for example, a PCM or an MRAM. A type of a transistor may be a hole-type or electronic-type metal oxide semiconductor field-effect transistor, a junctionless transistor, a thin film transistor, a two-dimensional material transistor, a nanowire transistor, a fin field-effect transistor, or a gate-all-around field-effect transistor. This is not limited in this disclosure.

Figure 6:
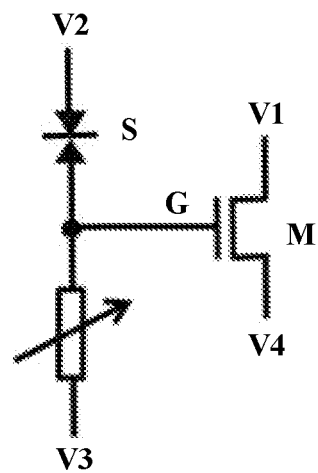
FIG. 6 is a schematic diagram of still another example of a storage and computing unit according to an embodiment of this disclosure.
Figure 7:
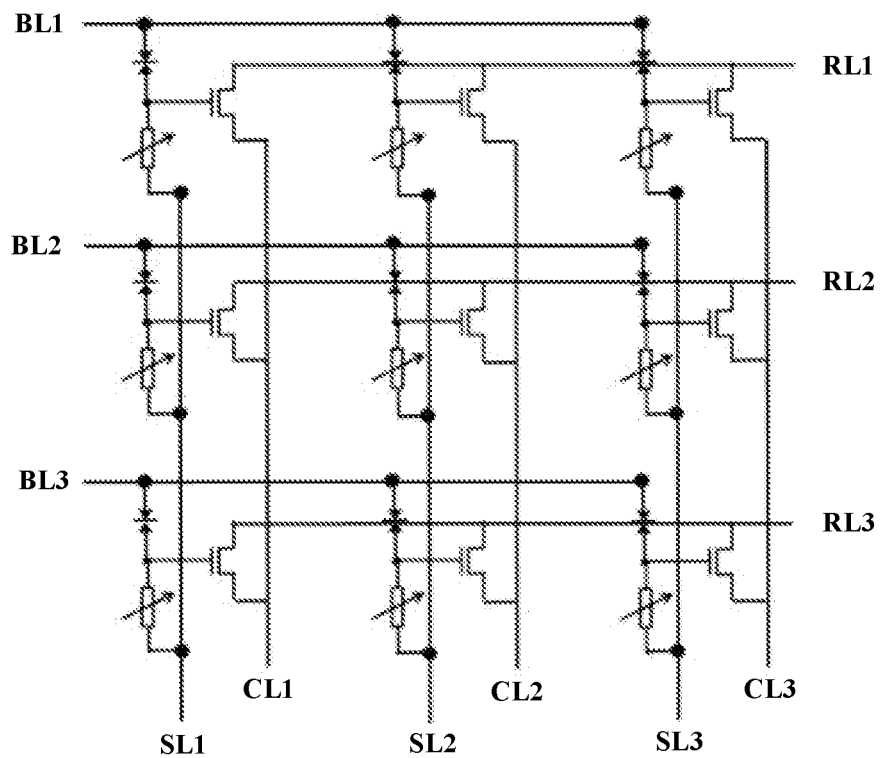
FIG. 7 is a schematic diagram of a storage and computing array according to an embodiment of this disclosure.

The foregoing is an implementation of the storage and computing unit and the chip according to the embodiments of this disclosure. With reference to FIG. 6 and FIG. 7, the following uses an example in which a resistance modulation unit is a selector(S), a resistive component is an RRAM, and a transistor 210 (M) is an NMOS to describe in detail specific implementations of another storage and computing unit and another chip in this disclosure.

As shown in FIG. 6, in the storage and computing unit according to another embodiment of this disclosure, one end of S is connected in series to one end of the RRAM to form series nodes, and the series nodes of S and the RRAM are connected to a gate electrode (G) of M.

For example, when a data read operation is performed, a read voltage (V2) is applied to the other end of S, where V2 is lower than a voltage that changes a resistance of the RRAM, and a ground voltage (V3) is applied to the other end of the RRAM. A high voltage (V1), for example, a 0.5 V voltage, is applied to a source electrode of M, and a ground voltage (V4) is applied to a drain electrode of M. If the RRAM is in a high-resistance state, a division voltage of S is relatively low, that is, S is in the high-resistance state, a voltage of the gate electrode G of M is lowest, and an output current of M is lowest, otherwise, if the RRAM is in a low-resistance state, a division voltage of S is relatively high, and S works in an ON state, that is, S is in the low-resistance state. In this case, the voltage of the gate electrode G of M is highest, and the output current of M is highest.

For example, during RRAM programming, S is in the low-resistance state, and corresponding write voltages are added to V2 and V3, to change a resistance of the RRAM and achieve RRAM programming.

Therefore, in the storage and computing unit provided in this embodiment of this disclosure, a voltage change range of the gate electrode of M can be increased, so that a change range of an output current of the storage and computing unit is not limited to a change range of a high resistance and a low resistance of the RRAM, thereby improving a current on-off ratio of M.

FIG. 7 shows a storage and computing array of another chip according to an embodiment of this disclosure. In this embodiment of this disclosure, a 3×3 storage and computing array in which three storage and computing units in each of horizontal and vertical directions are connected includes nine storage and computing units shown in FIG. 6. The storage and computing array includes three storage and computing unit rows and three storage and computing unit columns. Each row includes one BL and one RL. Each column includes one SL and one CL. One end of S in each row is electrically connected to the BL in the row. A source electrode of M in each row is electrically connected to the RL in the row. One end of an RRAM in each column is electrically connected to the SL in the column. A drain electrode of M in each column is electrically connected to the CL in the column.

In other words, one end of each selector S in a same row is connected to form a BL of the storage and computing array, one end of each RRAM in a same column is connected to form an SL of the storage and computing array, a drain electrode of each M1 in a same row is connected to form an RL of the storage and computing array, and a source electrode of each M1 in a same column is connected to form a CL of the storage and computing array.

For example, during programming of an RRAM in the array, an input voltage is applied to the BL, and a ground voltage is applied to the SL, so that resistances of other components are not affected during programming of the RRAM. Correspondingly, a voltage needs to be applied to an SL in an unselected column. When a computation read operation is performed, a read voltage is applied to the RL, and a current is output on the CL, thereby implementing the computation read operation.

For example, when the storage and computing array is used to perform computation reading, for example, when a computation read operation is performed on data stored in all RRAMs in FIG. 7, read voltages are applied to a BL1, a BL2, and a BL3, ground voltages are applied to an SL1, an SL2, and an SL3, and high voltages are applied to an RL1, an RL2, and an RL3. In this case, an output current of each M in the storage and computing array is output on the CL1, the CL2, and the CL3 separately, and the computation read operation of the array is completed.

The structure provided in this disclosure can simultaneously implement data storage function and data computing function, avoid a process of transmitting data in a memory unit to a computing unit through a data bus during computation, and effectively improve a computation processing speed. In addition, because an output current of a storage and computing unit has a feature of a very high on-off ratio, when the storage and computing array formed by storage and computing units is used for computation, transistors in more columns of the array may be turned on at the same time, and output current accumulation and computation are performed on the transistors, thereby significantly improving a computing capability. In other words, when completing large-scale computation, the storage and computing array provided in this disclosure reduces a quantity of operations, thereby effectively reducing energy consumption of a computing system.

It should be noted that in this embodiment of this disclosure, a quantity of rows and a quantity of columns of the array are merely examples for description, and are not limited. The selector may be a component that is connected at a low voltage and in a low-resistance state, and is disconnected at a high voltage and in a high-resistance state. Alternatively, the selector may be a component that is connected at a high voltage and in a low-resistance state, and is disconnected at a low voltage and in a high-resistance state. A type of the transistor may be a hole-type or electronic-type metal oxide semiconductor field-effect transistor, a junctionless transistor, a thin film transistor, a two-dimensional material transistor, a nanowire transistor, a fin field-effect transistor, or a gate-all-around field-effect transistor. This is not limited in this disclosure.

An embodiment of this disclosure further provides a chip, including the foregoing storage and computing array.

In addition, this disclosure further provides a storage and computing device, including the foregoing at least one chip.

Figure 8:
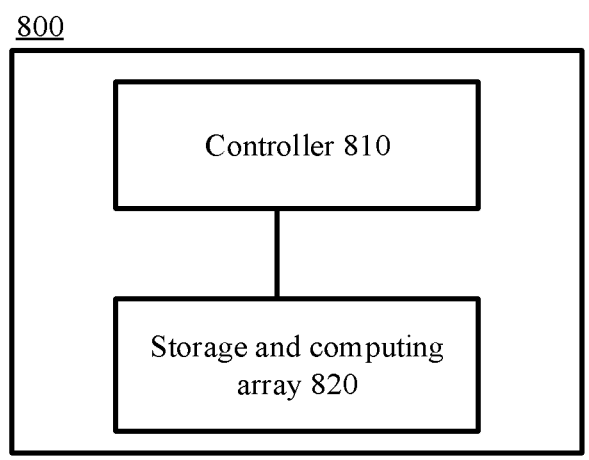
FIG. 8 is a schematic structural diagram of a chip according to an embodiment of this disclosure.

FIG. 8 shows an example of a chip 800 according to this disclosure. The chip 800 includes a controller 810 and a storage and computing array 820. The storage and computing array 820 may be any implementation of the storage and computing array shown in FIG. 5 or FIG. 7 in the foregoing embodiments. A control circuit in the controller 810 implements the corresponding control over the storage and computing array 820 in the embodiment shown in FIG. 5 or FIG. 7. The controller 810 controls the storage and computing array 820 to implement data storage and computing functions.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An apparatus, comprising:
    a first transistor comprising:
        a first electrode configured to control the first transistor to be coupled or decoupled;
        a second electrode coupled to a read line and configured to obtain a first voltage indicating second data; and
        a third electrode coupled to a computing line and configured to output a current to the computing line indicating a computation result of first data and the second data when a read voltage is applied to the read line, wherein a ratio of a highest current output by the third electrode to the computing line to a lowest current of output by the third electrode to the computing line is greater than 2,000;
    a memristor comprising a first port and a second port, wherein the first port is coupled to the first electrode and is configured to store the first data, wherein the memristor has a first resistance indicating the first data, and wherein the memristor has a first lowest-resistance state and a first highest-resistance state;
    a resistance modulation system comprising a third port and a fourth port, wherein the third port is coupled to the first electrode, wherein the memristor and the resistance modulation system comprise a series connection from the second port of the memristor to the fourth port of the resistance modulation system, wherein the resistance modulation system has a second lowest-resistance state and a second highest-resistance state, and wherein the resistance modulation system is configured to:
        configure, in response to the memristor being in the first highest-resistance state, the resistance modulation system to be in the second lowest-resistance state to control a gate voltage applied to the first electrode to be at a highest electrical level and the current of the first transistor to be at the highest current; and
        configure, in response to the memristor being the first lowest-resistance state, the resistance modulation system to be in the second highest-resistance state to control the gate voltage applied to the first electrode to be at a lowest electrical level and the current of the first transistor to be at the lowest current; and
    additional first transistors coupled to the read line and the computing line, wherein the first transistor and the additional first transistors are configured to be turned on at the same time, and wherein the apparatus is configured to accumulate output currents from the first transistor and the additional first transistors to perform a read operation.

2. The apparatus of claim 1, wherein the resistance modulation system comprises a second transistor, wherein the second transistor comprises:
    a fourth electrode configured to control the second transistor to be coupled or decoupled;

a fifth electrode; and
a sixth electrode, and
wherein the third port comprises the fifth electrode or the sixth electrode.

3. The apparatus of claim 1, wherein the resistance modulation system comprises a selector.

4. The apparatus of claim 1, wherein the memristor comprises a phase change memory, a ferroelectric memory, a magnetoresistive random-access memory (RAM), or a resistive RAM.

5. The apparatus of claim 1, wherein the resistance modulation system comprises a varistor.

6. An apparatus, comprising:
a storage and computing array comprising a plurality of first storage and computing systems, wherein each of the first storage and computing systems comprises:
a first transistor comprising:
a first electrode configured to control the first transistor to be coupled or decoupled;
a second electrode coupled to a read line and configured to obtain a first voltage indicating second data; and
a third electrode coupled to a computing line and configured to output a current to the computing line indicating a computation result of first data and the second data when a read voltage is applied to the read line, wherein a ratio of a highest current output by the third electrode to the computing line to a lowest current of output by the third electrode to the computing line is greater than 2,000;
a first memristor comprising a first port and a second port, wherein the first port of the first memristor is coupled to the first electrode, wherein the first memristor is configured to store the first data, wherein the first memristor has a first resistance indicating the first data, and wherein the first memristor has a first lowest-resistance state and a first highest-resistance state;
a first resistance modulation system comprising a third port and a fourth port, wherein the third port is coupled to the first electrode, wherein the first memristor and the first resistance modulation system comprise a series connection from the second port of the first memristor to the fourth port of the first resistance modulation system, wherein the first resistance modulation system has a second lowest-resistance state and a second highest-resistance state, and wherein the first resistance modulation system is configured to:
configure, in response to the first memristor being in the first highest-resistance state, the first resistance modulation system to be in the second lowest-resistance state to control a gate voltage applied to the first electrode to be at a highest electrical level and the current of the first transistor to be at the highest current; and
configure, in response to the first memristor being the first lowest-resistance state, the first resistance modulation system to be in the second highest-resistance state to control the gate voltage applied to the first electrode to be at a lowest electrical level and the current of the first transistor to be at the lowest current; and
additional first transistors coupled to the read line and the computing line, wherein the first transistor and the additional first transistors are configured to be turned on at the same time, and wherein the apparatus is configured to accumulate output currents from the first transistor and the additional first transistors to perform a read operation.

7. The apparatus of claim 6, wherein the first resistance modulation system comprises a selector.

8. The apparatus of claim 7, wherein the storage and computing array comprises the first storage and computing systems in M rows×N columns, wherein M and N are integers greater than 1, wherein fifth ports of second resistance modulation systems in a plurality of second storage and computing systems located in a same row are coupled to a bit line, wherein fourth electrodes of second transistors in the second storage and computing systems are coupled to an input data line, wherein the input data line is configured to input to-be-computed data, wherein fifth electrodes of third transistors in a plurality of third storage and computing systems located in a same column are coupled to an output data line, wherein the output data line is configured to output a computation result, wherein sixth ports of second memristors in the third storage and computing systems are coupled to a selection line, and wherein the bit line and the selection line are configured to select fourth storage and computing systems that are to perform computation.

9. The apparatus of claim 6, wherein the first resistance modulation system further comprises a second transistor, and wherein the second transistor comprises:
a fourth electrode configured to control the second transistor to be coupled or decoupled;
a fifth electrode; and
a sixth electrode,
wherein the third port comprises the fifth electrode or the sixth electrode.

10. The apparatus of claim 9, wherein the storage and computing array comprises the first storage and computing systems in M rows×N columns, wherein M and N are integers greater than 1, wherein fifth ports of second resistance modulation systems in a plurality of second storage and computing systems located in a same column are coupled to a bit line, wherein the third port comprises the sixth electrode, wherein seventh electrodes of third transistors in a plurality of third storage and computing systems located in a same row are coupled to an input data line, wherein the input data line is configured to input to-be-computed data, wherein eighth electrodes of fourth transistors in the second storage and computing systems are coupled to an output data line, wherein the output data line is configured to output a computation result, wherein sixth ports of second memristors in the second storage and computing systems are coupled to a selection line, wherein ninth electrodes of fifth transistors in the third storage and computing systems are coupled to a word line, wherein the word line is configured to control the fifth transistors to be coupled and decoupled, and wherein the bit line and the selection line are configured to select fourth storage and computing systems that are to perform computation.

11. The apparatus of claim 9, wherein the storage and computing array comprises the first storage and computing systems in M rows×N columns, wherein M and N are integers greater than 1, wherein fifth ports of second resistance modulation systems in a plurality of second storage and computing systems located in a same column are coupled to a bit line, wherein the third port comprises the sixth electrode, wherein seventh electrodes of third transistors in a plurality of third storage and computing systems located in a same row are coupled to an input data line, wherein the input data line is configured to input to-be-computed data, wherein eighth electrodes of fourth transistors in the second storage and computing systems are coupled to an output data line, wherein the output data line is configured to output a computation result, wherein sixth ports of second memristors in the third storage and computing systems are coupled to a selection line, wherein ninth electrodes of fifth transistors in the third storage and computing systems are coupled to a word line, wherein the word line is configured to control the fifth transistors to be coupled and decoupled, and wherein the bit line and the selection line are configured to select fourth storage and computing systems that are to perform computation.

12. The apparatus of claim 6, wherein the first memristor comprises a phase change memory, a ferroelectric memory, a magnetoresistive random-access memory (RAM), or a resistive RAM.

13. The apparatus of claim 6, wherein the first resistance modulation system comprises a varistor, wherein the storage and computing array comprises the first storage and computing systems in M rows×N columns, wherein M and N are integers greater than 1, wherein fifth ports of second resistance modulation systems in a plurality of second storage and computing systems located in a same row are coupled to a bit line, wherein fourth electrodes of second transistors in the second storage and computing systems are coupled to an input data line, wherein the input data line is configured to input to-be-computed data, wherein fifth electrodes of third transistors in a plurality of third storage and computing systems located in a same column are coupled to an output data line, wherein the output data line is configured to output a computation result, wherein sixth ports of second memristors in the third storage and computing systems are coupled to a selection line, and wherein the bit line and the selection line are configured to select fourth storage and computing systems that are to perform computation.

14. The apparatus of claim 6, wherein the storage and computing array is configured to simultaneously implement data storage and computing functions.

15. An apparatus, comprising:
a chip comprising:
   a storage and computing array comprising a plurality of storage and computing systems, wherein each of the storage and computing systems comprises:
      a transistor comprising:
         a first electrode configured to control the transistor to be coupled or decoupled;
         a second electrode coupled to a read line and configured to obtain a first voltage indicating second data; and
         a third electrode coupled to a computing line and configured to output a current to the computing line indicating a computation result of first data and the second data when a read voltage is applied to the read line, wherein a ratio of a highest current output by the third electrode to the computing line to a lowest current of output by the third electrode to the computing line is greater than 2,000;
      a memristor comprising a first port and a second port, wherein the first port is coupled to the first electrode, wherein the memristor is configured to store the first data, wherein the memristor has a first resistance indicating the first data, and wherein the memristor has a first lowest-resistance state and a first highest-resistance state;
      a resistance modulation system comprising a third port and a fourth port, wherein the third port is coupled to the first electrode, wherein the memristor and the resistance modulation system comprise a series connection from the second port of the memristor to the fourth port of the resistance modulation system, wherein the resistance modulation system has a second lowest-resistance state and a second highest-resistance state, and wherein the resistance modulation system is configured to:
         configure, in response to the memristor being in the first highest-resistance state, the resistance modulation system to be in the second lowest-resistance state to control a gate voltage applied to the first electrode to be at a highest electrical level and the current of the transistor to be at the highest current; and
         configure, in response to the memristor being the first lowest-resistance state, the resistance modulation system to be in the second highest-resistance state to control the gate voltage applied to the first electrode to be at a lowest electrical level and the current of the transistor to be at the lowest current; and
      additional first transistors coupled to the read line and the computing line, wherein the transistor and the additional transistors are configured to be turned on at the same time, and wherein the apparatus is configured to accumulate output currents from the first transistor and the additional first transistors to perform a read operation.

16. The apparatus of claim 15, wherein the resistance modulation system comprises a second transistor, wherein the second transistor comprises:
   a fourth electrode configured to control the second transistor to be coupled or decoupled;
   a fifth electrode; and
   a sixth electrode, and
   wherein the third port comprises the fifth electrode or the sixth electrode.

17. The apparatus of claim 15, wherein the resistance modulation system comprises a selector.

18. The apparatus of claim 15, wherein the resistance modulation system comprises a varistor.

19. The apparatus of claim 15, wherein the memristor comprises a phase change memory.

20. The apparatus of claim 15, wherein the memristor comprises a ferroelectric memory.

* * * * *